United States Patent
Angelo et al.

(10) Patent No.: US 12,056,486 B2
(45) Date of Patent: *Aug. 6, 2024

(54) SOFTWARE SUPPLY CHAIN QUALITY CONTROL EVALUATION USING BLOCKCHAIN

(71) Applicant: MICRO FOCUS LLC, Santa Clara, CA (US)

(72) Inventors: Michael F. Angelo, Houston, TX (US); Alexander Hoole, Santa Clara, CA (US)

(73) Assignee: Micro Focus LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,042

(22) Filed: Jun. 22, 2023

(65) Prior Publication Data

US 2023/0333843 A1   Oct. 19, 2023

Related U.S. Application Data

(63) Continuation of application No. 17/324,872, filed on May 19, 2021, now Pat. No. 11,726,773.

(51) Int. Cl.
*G06F 8/70* (2018.01)
*G06F 16/27* (2019.01)
(Continued)

(52) U.S. Cl.
CPC ............. *G06F 8/70* (2013.01); *H04L 9/3239* (2013.01); *G06F 16/27* (2019.01); *H04L 9/50* (2022.05)

(58) Field of Classification Search
None
See application file for complete search history.

(56) References Cited

U.S. PATENT DOCUMENTS 10,795,977 B2   10/2020   Salomon
10,810,004 B2   10/2020   Mills
(Continued)

FOREIGN PATENT DOCUMENTS

CN   109446089 A   3/2019
CN   109783372 A   5/2019
(Continued)

OTHER PUBLICATIONS

Singi et al. "Compliance adherence in distributed software delivery: a blockchain approach," Proceedings of the 13th International Conference on Global Software Engineering ICGSE '18, May 2018, pp. 131-132 (Abstract only).

*Primary Examiner* — Qing Chen
(74) *Attorney, Agent, or Firm* — Sheridan Ross P.C.

(57) ABSTRACT

A primary blockchain for a software application is created that comprises a first block associated with a software component of the software application. An event is received that is associated with the software component. In response to receiving the event, a component blockchain is created that is associated with the software component. The component blockchain comprises a second block associated with the event. The component blockchain links to the primary blockchain. This provides a structure for managing supply chains of software components. As new software components are received, the new software components can be managed and tracked for quality/security.

20 Claims, 8 Drawing Sheets

(51) Int. Cl.
    *H04L 9/00*    (2022.01)
    *H04L 9/32*    (2006.01)

(56)         References Cited

U.S. PATENT DOCUMENTS 10,838,846  B1    11/2020  Saleh-Esa
 2018/0260212  A1     9/2018  Wisnovsky
 2020/0026510  A1     1/2020  Adams
 2020/0118068  A1*    4/2020  Turetsky ............. G06F 9/45558
 2020/0394038  A1    12/2020  Bui
 2020/0394308  A1*   12/2020  Angelo ................ G06F 21/577
 2020/0394309  A1*   12/2020  Angelo ................ H04L 9/3297

FOREIGN PATENT DOCUMENTS

CN        110633198  A    12/2019
 CN        111367793  A     7/2020
 CN        112199293  A     1/2021

* cited by examiner

SOFTWARE SUPPLY CHAIN QUALITY CONTROL EVALUATION USING BLOCKCHAIN

CROSS REFERENCE TO RELATED APPLICATION

The present application is a continuation of U.S. patent application Ser. No. 17/324,872 (now issued as U.S. Pat. No. 11,726,773), filed May 19, 2021, the entire disclosure of which is hereby incorporated by reference.

FIELD

The disclosure relates generally to blockchain and particularly to software supply chain management using blockchain.

BACKGROUND

One of the problems associated with software development is that the software may comprise software components that come from various places, such as, open source sites, third parties, internal developers, contractors, etc. A key issue is how do we know that the software component is a quality software component that is also secure. In many cases, there is little or no information about the quality and/or security of the software components that come from a supply chain, such as, from an open source software site.

With current blockchain technology that tracks software components, when a third party software component is added to a blockchain, the third party software component is added in the same manner as when a new software component is added. While this is useful, it does not provide any history or assurance that the third party software component has been validated to be secure and/or have a high level of quality.

SUMMARY

These and other needs are addressed by the various embodiments and configurations of the present disclosure. A primary blockchain for a software application is created that comprises a first block associated with a software component of the software application. An event is received that is associated with the software component. In response to receiving the event, a component blockchain is created that is associated with the software component. The component blockchain comprises a second block associated with the event. The component blockchain links to the primary blockchain. This provides a structure for managing supply chains of software components. As new software components are received, the new software components can be managed and tracked for quality/security.

The present disclosure can provide a number of advantages depending on the particular configuration. These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and include a version field, the hash of the previous block, the root hash of the merkle tree of all transactions (or information or data) in the block, the current time, and the difficulty level. The nonce can be stored in an extraNonce field, which is stored as the left most leaf node in the merkle tree. The counter parameter is often small at 32-bits so each time it wraps the extraNonce field must be incremented (or otherwise changed) to avoid repeating work. When validating or verifying a block, the hashcash algorithm repeatedly hashes the block header while incrementing the counter & extraNonce fields. Incrementing the extraNonce field entails recomputing the merkle tree, as the transaction or other information is the left most leaf node. The body of the block contains the transactions or other information. These are hashed only indirectly through the Merkle root.

The term "event" are events that are associated with a software component or a software application, such as, a version of the software component, a check-in time for the software component, who checked in the software component, modifications to the software component, testing of the software component, specific tests run on the software component, when the specific tests were run on the software component, identified bugs in the software component, depth of tests of the software component, a percentage of code paths covered in the software component, customer feedback of the software component, how the identified bugs were mitigated and/or fixed in the software component, virus scans of the software component, types of security tests run on the software component, anomalies detected when testing the software component, integrated development environments used in developing the software component, compilers used in compiling the software component, virtual machines used in testing the software component, sign-offs of testing processes for the software component, a history of retesting to validate fixes for the software complement, a version of the application, a sign-off of the application, and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
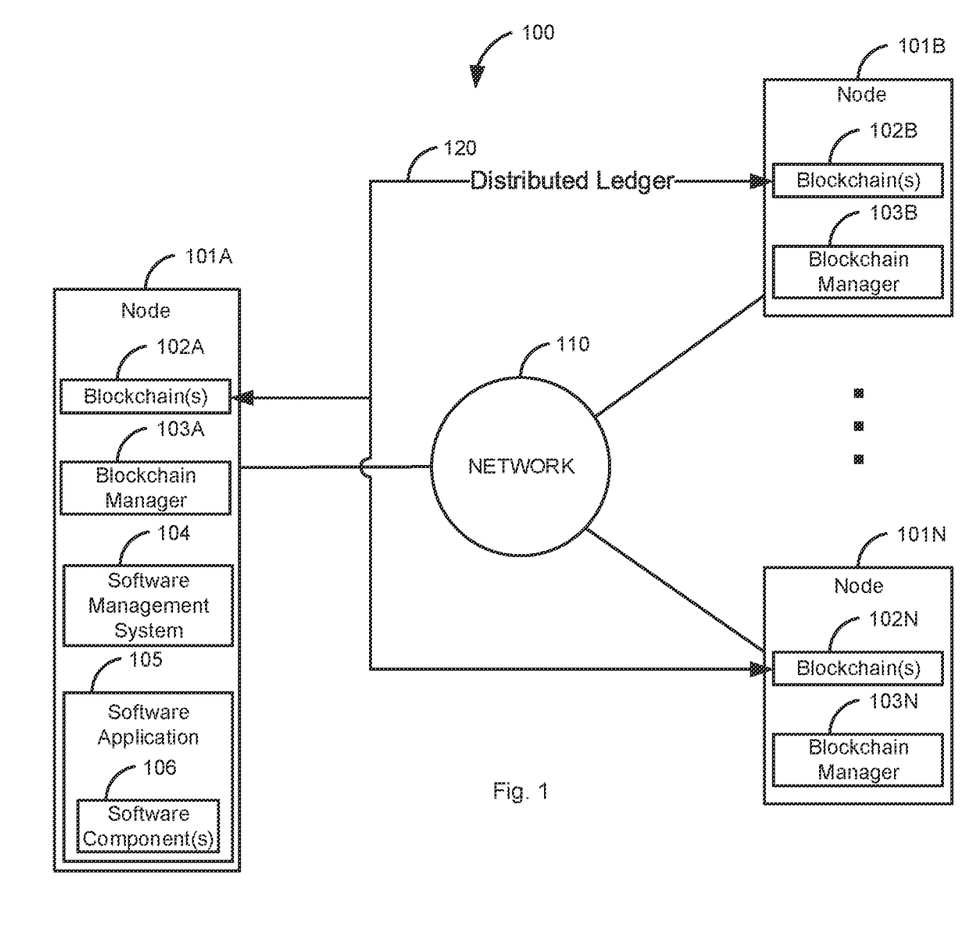
FIG. 1 is a block diagram of a first illustrative system that shows a blockchain in a distributed ledger.

FIG. 1 is a block diagram of a first illustrative system 100 that shows a blockchain 102 in a distributed ledger 120. The first illustrative system 100 comprises nodes 101A-101N and a network 110.

The nodes 101A-101N can be or may include any hardware/software that can support the use of blockchains 102 in the distributed ledger 120, such as, a Personal Computer (PC), a server, a trust authority server, a gateway, a router, and/or the like. As shown in FIG. 1, any number of nodes 101A-101N may be connected to the network 110. The nodes 101A-101N further comprise blockchains 102A-102N and blockchain managers 103A-103N.

The blockchains 102A-102N are copies of the same blockchain 102 that comprise the distributed ledger 120. The size of the blockchains 102A-102N may vary based on implementation. The blockchains 102A-102N are a form of a replicated distributed database.

The blockchain managers 103A-103N can be or may include any hardware coupled with software that can manage the blockchains 102A-102N. The blockchain managers 103A-103N work together to determine how to manage the blockchains 102A-102N. For example, the blockchain managers 103A-103N may vote to validate a new block being added to the blockchains 102A-102N in the distributed ledger 120.

The node 101A further comprises a software management system 104 and a software application 105. The software management system 104 can be or may include any hardware/software that can be used to track software and events associated with the software application 105.

The software application 105 can be any software application 105, such as, a user application, a web application, a network application, a video application, a gaming application, an embedded application (stored in firmware), and/or the like. The application 105 comprises one or more software components 106. The software component(s) 105 may be any kind of software component 105, such as, a java class library, a binary, a library, a script, and/or the like. The software component(s) 105 may be based on any programming language, such as Java, C, C++, Pearl, assembly language, COBOL, Python, JavaScript, Hyper Text Markup Language (HTML), and/or the like.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

Figure 2:
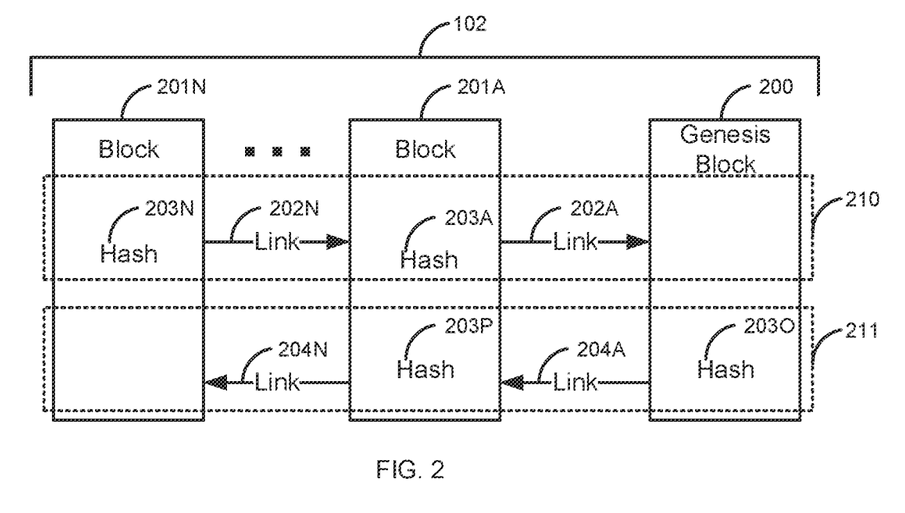
FIG. 2 is a diagram of a blockchain.

FIG. 2 is a diagram of a blockchain 102. Illustratively, the nodes 101A-101N, the blockchain managers 103A-103N, the software management system 104, the software application 105 and the software component(s) 106 are stored-program-controlled entities, such as a computer or microprocessor, which performs the method of FIGS. 2-7 and the processes described herein by executing program instructions stored in a computer readable storage medium, such as a memory (i.e., a computer memory, a hard disk, and/or the like). Although the methods/structures described in FIGS. 2-7 are shown in a specific order or configuration, one of skill in the art would recognize that the steps/structures in FIGS. 2-7 may be implemented in different orders/structures and/or be implemented in a multi-threaded environment. Moreover, various steps may be omitted or added based on implementation.

The blockchain 102 of FIG. 2 comprises a genesis block 200, block 201A, and block 201N. The designation "N" for block 201N (or any reference herein) indicates that there may be any number of blocks 201 in between blocks 201A and 201N, including zero blocks 201. The description generally assumes that there are not any blocks 201 between blocks 201A and 201N. In the blockchain 102 of FIG. 2, block 201N has a forward link 202N back to block 201A. Likewise, block 201A has a forward link 202A back to the genesis block 200. The hash 203N is a hash of the block 201A. Likewise, the hash 203A is a hash of the genesis block 200. The forward links 202A-202N and the hashes 203A and 203N of the blockchain 102 comprise a complete forward hash 210 of the blockchain 102. Traditional blockchains 102 like Bitcoin™ use a complete forward hash 210 similar to what is described in FIG. 2 for verification of the blockchain 102.

The blockchain 102 may also comprise a complete reverse hash 211. The complete reverse hash 211 comprises reverse links 204A-204N and hashes 203O-203P. The hash 203O is a hash of block 201A and the hash 203P is a hash of the block 201N. The reverse hash 211 is used to detect hash collisions that may occur in the forward hash 210. A hash collision is where two different sets of data produce the same hash. Thus, if a hacker has altered the data in the block 201A with new data that results in a hash collision of the hash 203N, the change can be detected by the complete reverse hash 211. The complete reverse hash 211 further ensures the integrity of the blockchain 102. However, the use of the complete reverse hash also has a cost of additional processing to ensure the integrity of the blockchain 102.

The hash 203 may be generated using known hashing algorithms, such as Securing Hashing Algorithm (e.g. SHA 256), Message Digest Algorithm (e.g., MD 5), and/or the like. In one embodiment, instead of using a complete reverse hash 211, a second complete forward hash 210 may be used where two different hashing algorithms (e.g., SHA 256 and MD 5) may be used to detect hash collisions.

Figure 3:
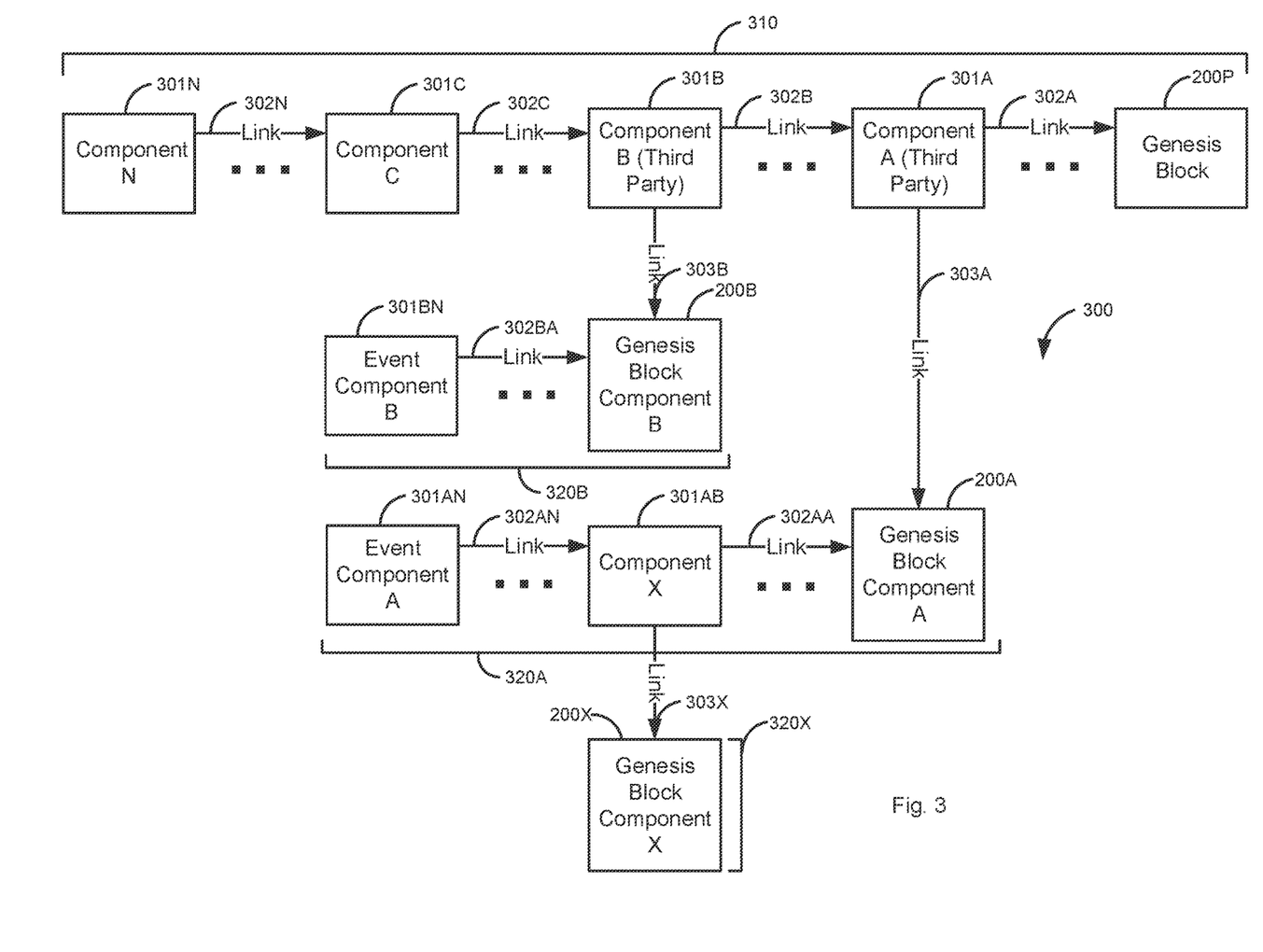
FIG. 3 is a diagram of an exemplary blockchain structure for validating the quality/security of components of an application.

FIG. 3 is a diagram of an exemplary blockchain structure 300 for validating the quality/security of software components 106 of an application 105. The blockchain structure 300 comprises a primary blockchain 310, component blockchains 320A-320B, and component blockchain 320X.

The primary blockchain 310 comprises the genesis block 200P and blocks 301A-301N. The genesis block 200P is a traditional genesis block 200. The blocks 301A-301N are blocks for individual software components 106 of an application 105. For example, the blocks 301A-301N may represent different java class libraries that make up a Java software application 105. The blocks 301A-301N may represent any kind of software component 106 that is developed in any programming language. The blocks 301A-301N may represent complied binaries and/or run-time libraries. The run-time libraries may or may not be compiled. The blocks 301A-301N are linked together via forward links 302A-302N (similar to the forward links 202A-202N). The blocks 301A-301B represent third party software components 106. A third party software component 106 may be any software component 106 that is developed externally, such as, open source software, a library (e.g., a dynamic linked library), a software component 106 developed by another party, and/or the like. The third party software components 106 may be treated like internally developed software components 106 and tested/validated in the same way. Blocks 301C-301N represent software components 106 that are developed internally. The blocks 301C-301N may be added in any order depending upon implementation, such as, when the components are initially created, when the components are added to a code tracking system, and/or the like.

The block 301A has a reverse link 303A that points to the component blockchain 320A. The component blockchain 320A comprises genesis block 200A, block 301AB (for component X) and block 301AN (an event associated with component A). The genesis block 200A is typically unique in that it contains information about the component A. The block 301A may also have a complete hash (forward and/or reverse) of the component blockchain 320A. The complete hash is used to validate the hashes of the component blockchain 320A.

The block 301AB (for component X) also has a reverse link 303X that points to the genesis block 200X. Although not shown for convenience, the component blockchain 320X may comprise additional blocks 301 for events associated with component X.

The block 301B has a reverse link 303B that points to the component blockchain 320B. The component blockchain 320B comprises genesis block 200B and block 301BN (an event block for component B).

When a third party software component 106 (e.g., component A) is added to the application 105, the block 301A is added to the primary blockchain 310. A genesis block 200A is created. The block 301A has a reverse link 303A that points to the genesis block 200A. As a result, the blockchain 320A for the software component A 106 is created that tracks the event history in the component blockchain 320A for the software component A 106. As shown in FIG. 3, the component blockchain 320B is created the same way.

Figure 4:
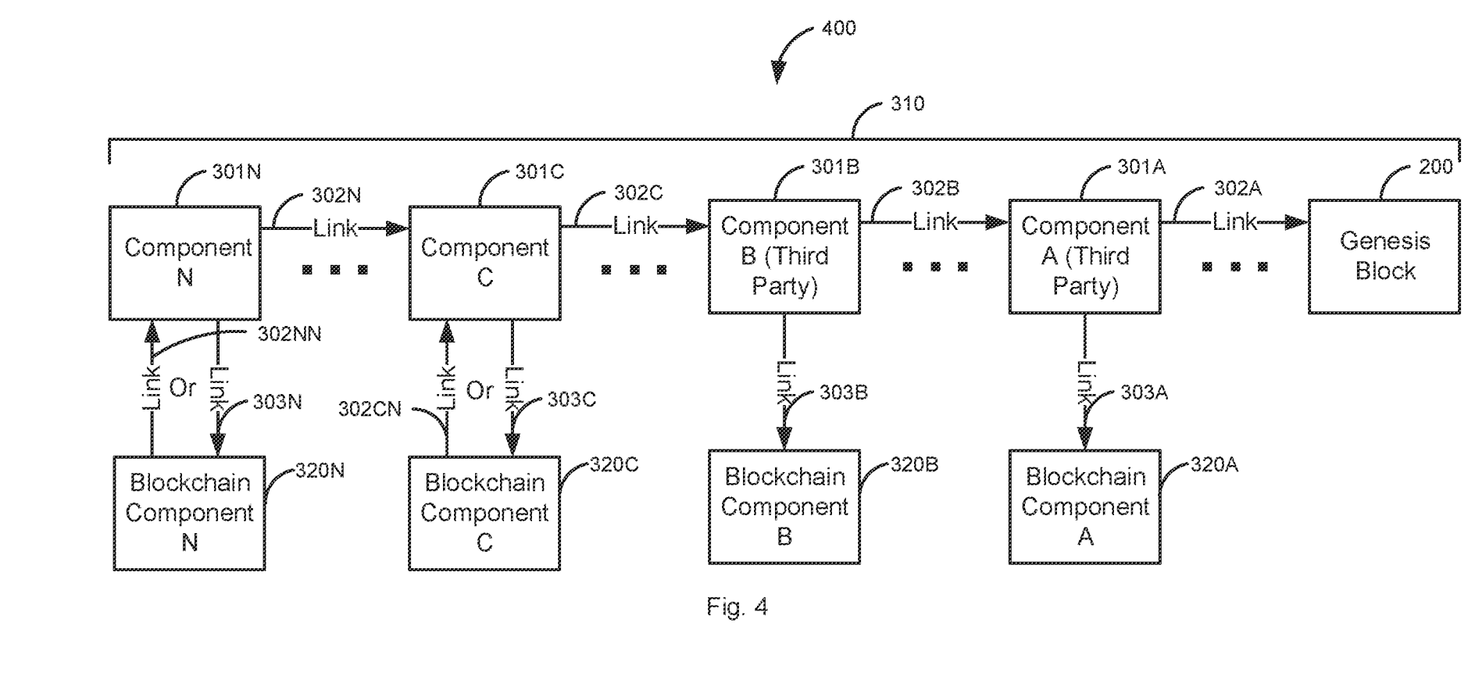
FIG. 4 is a diagram of an exemplary blockchain structure for validating the quality/security of components of an application.

FIG. 4 is a diagram of an exemplary blockchain structure 400 for validating the quality/security of components 106 of an application 105. FIG. 4 comprises the primary blockchain 310 and component blockchains 320A-320N. Like shown in FIG. 3, the component blockchain 320A for the software component A 106 also includes the reverse link 303A to the component blockchain 320A. Although not shown, there may be a reverse link 303X in the component blockchain 320X.

Likewise, the reverse link 303B links to the component blockchain 320B like described in FIG. 3. In FIG. 4, the internally developed software components 106 (for components C-N) are stored as blocks 301 (e.g., a test of the software component) in the blockchains 320C-320N when the events occur. The reverse links 303C-303N to the component blockchains 320C-320N may be the same types of links as reverse links 303A-303B as described in FIG. 3. Alternatively, the forward links 302CN and 302NN may work similar to the forward links 302A-302N where the forward links 302CN/302NN point from the component blockchains 320C-320N to the blocks 301C-301N. The reason the forward links 302CN-302NN can point to the blocks 301C-301N is because the blockchains 320C-320N are newly created when they are added. Thus, the forward links 302CN-302NN can be added in the same manner as forward links 302A-302N.

Figure 5:
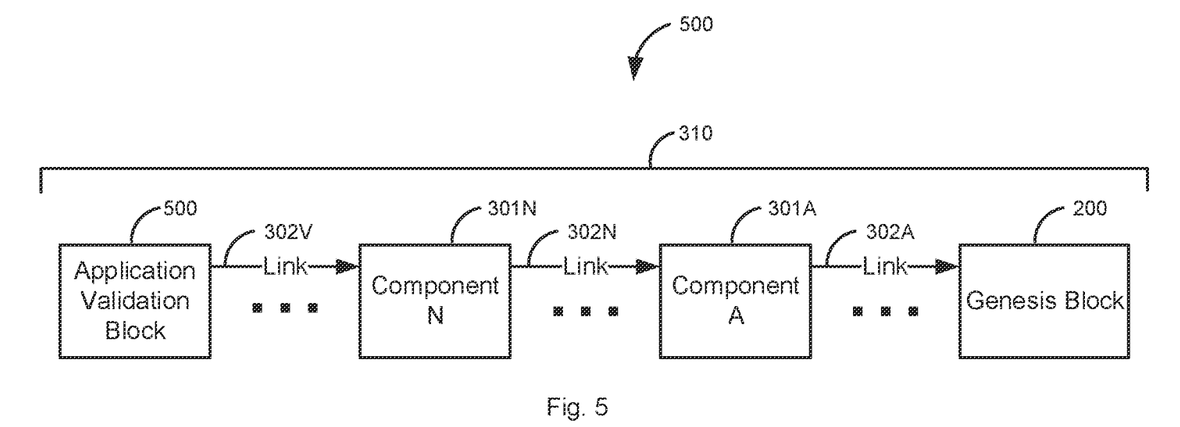
FIG. 5 is a diagram of a primary blockchain that comprises an application validation block.

FIG. 5 is a diagram of a primary blockchain 310 that that comprises an application validation block 500. The primary blockchain 310, like in FIGS. 3-4 comprise the blocks 310A-301N and forward links 302A-302N. In addition, the primary blockchain comprises the application validation block 500.

The application validation block 500 has been added to the end of the primary blockchain 310. The application validation block 500 has a forward link 302V that points to the block 301N and works similar to the forward links 302A-302N. The application validation block 500 may also have a hash of the block 301N as is done with traditional blockchain.

In one embodiment, the validation block 500 signifies that no more blocks will be added to the primary blockchain 310 because all testing/verification of this version of the software application 105 has been completed. This includes the testing/verification of all the software components 106 of the software application 105. The application validation block 500 may include information about how much testing (i.e., the events described herein) has been completed based on a defined standard. The level of quality may comprise multiple levels of quality. For example, there may be a level of security testing, a level of quality testing, a user interface quality level, a standard (an IETF standard) conformance level, a level of testing of individual software components/modules within the software component (e.g., the software component is a Java class library), etc. The application validation block 500 is generated by gathering all the event information (e.g., testing information, security scans, anomaly detection, virus scans, associated history) of the primary blockchain 310/component blockchains 320 and comparing it with a known or defined standards/thresholds to produce the level(s) of quality. Once the primary blockchain 310 is sealed by the application validation block 500, the primary blockchain 310/component blockchains 320 becomes forensic information for what has been done with the software application 105. This allows anyone else who wants to use the software application 105 to look at the application validation block 500 and identify a level of quality/security for the software application 105.

In a different embodiment, the application validation block 500 may not necessarily be an end block. Instead, in this embodiment, the application validation block 500 is a validation up to a point in time. For example, the application validation block 500 may indicate a quality score of 80 out of 100. If further testing is done or a second version is created, a second application validation block 500 may be added to indicate that the quality score is now 96 out of 100. In this example, the application validation blocks 500 show the history of quality improvement (or digression) over time.

Figure 6:
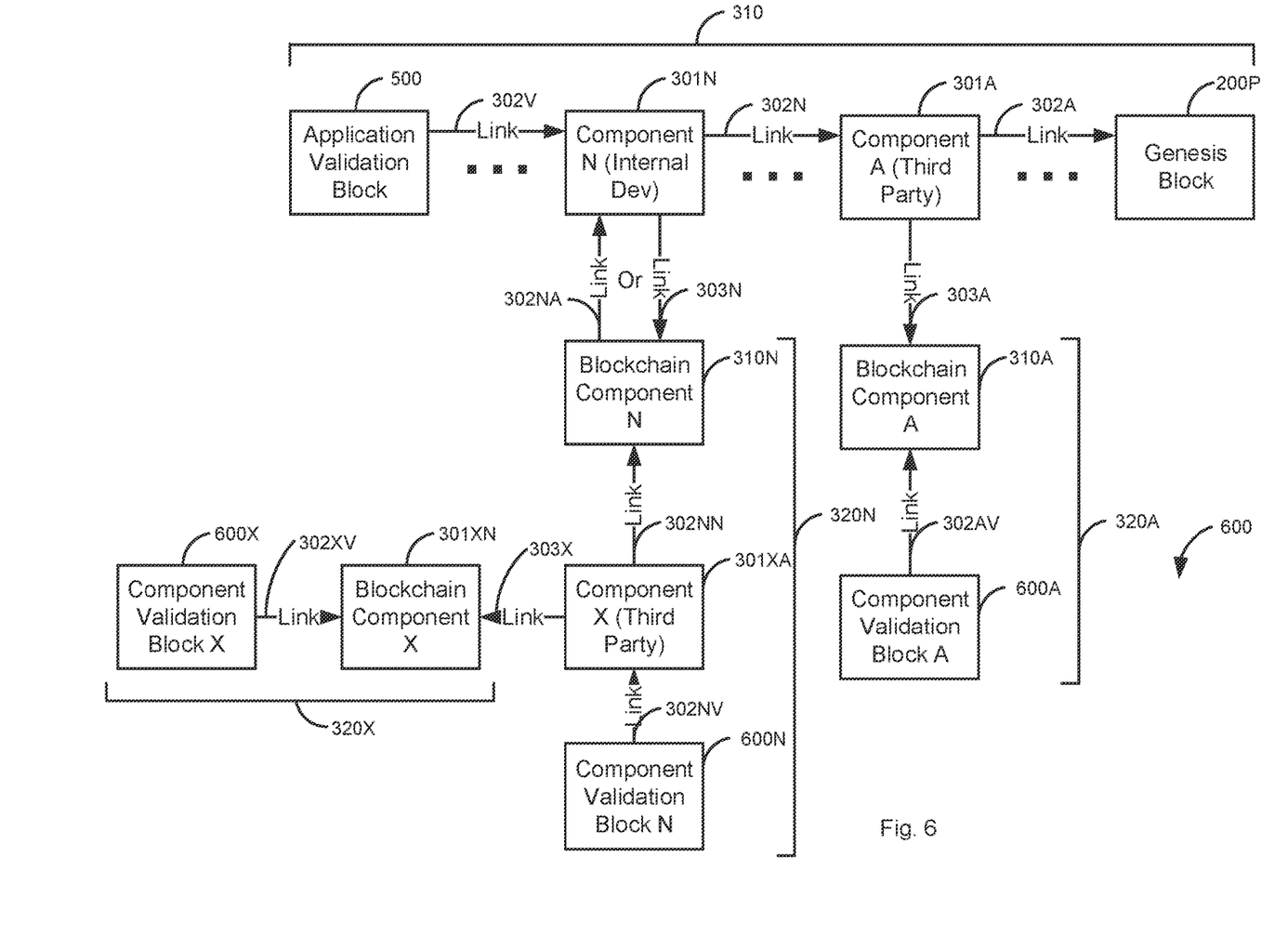
FIG. 6 is a diagram of an exemplary blockchain structure for validating the quality/security of components in an application.

FIG. 6 is a diagram of an exemplary blockchain structure 600 for validating the quality/security of components 106 in an application 105. The blockchain structure 600 comprises the primary blockchain 310, component blockchains 320A-320N, and the component blockchain 320X. The primary blockchain 310 is similar to the blockchain 310 as shown in FIG. 5 with the application validation block 500/forward link 302V.

The component blockchains 320A-320N are similar to the component blockchains 320 described previously. However, what is different is that the component blockchains 320A-320N each have a corresponding component validation block 600A-600N/600X and corresponding forward links 302AV/302NV/302XV. The component validation blocks 600A-600N/600X/forward links 302AV/302NV/302XV are added in a similar manner as described for the application validation block 500/forward link 302V. The component validation blocks 600A-600N/600X work similar to the application validation block 500 except that instead of covering the whole application 105, the component validation blocks 600A-600N cover the individual software components 106 of the software application 105.

For example, like described for the application validation block 500, the component validation block 600 typically signifies that no more blocks will be added to the component blockchain 320 because all testing/verification of this version of the software component 106 has been completed. The component validation block 600 may include information about how much testing (i.e., the events) has been completed based on a defined standard. The level of quality may comprise multiple levels of quality. For example, there may be a level of security testing, a level of quality testing, a user interface quality level, a standard (an IETF standard) conformance level, a level of testing of individual software components 106/modules within the software component 106 (e.g., the software component 106 is a java class library), etc. The component validation block 600 is generated by getting the event information (e.g., testing information, security scans, anomaly detection, virus scans, associated history) of the software component 106 and comparing it with a known or defined standard to produce the level(s) of quality/security. Once the component blockchain 320 is sealed by the component validation block 600, the component blockchain 320 becomes forensic information for what has been done with the software component 106. This allows anyone else who wants to use the software component to look at the component validation block 600 and identify a level of quality/security for the software component 106. The component validation block 600 allows for the software component 106 to be used in other software applications 105 in a supply chain.

The use of component blockchains 320 for software components 106 will typically be for individual versions of the software component 106. However, the blockchain 320 may contain multiple versions of the software component 106 where each version has a corresponding component validation block 600 in the component blockchain 320. For example, if there were two versions stored in the component blockchain 320, there would be two component validation blocks 600 at the end of the blocks 301 for the corresponding version. Thus, there would be one component blockchain 320 that comprises an event history for two software versions. For example, the component blockchains 320 contain the event history of a major release and any minor releases.

Thus, each software component 106 and the final application 105 will have a corresponding validation block 500/600 and quality and/or security score. For example, as shown in FIG. 6, software component A 106 (a third party component) has the component validation block 600A. Likewise, software component N 106 (an internally developed software component 106) has a component validation block 600N.

The component validation block 600N for software component N 106 is generated based not only on software component N 106, but may also be based on the information in the component validation block 600X. This is accomplished by taking the score(s) in the component validation block 600X and the scores of the transactions in the in the blockchain 320N to provide an overall score the component validation block 600N. The application validation block 500 does a similar thing as is done in the component validation block 600N, where the scores from all the component validation blocks 600A-600N (and possibly 600X) are used to calculate the scores for the application validation block 500. The application validation block 500 provides a total quality/security score for the application 105.

The score of the application validation block 500 may be based on the size of each component. For example, if component A 106 is 100K lines of code and component N is 10K lines of code, the scores in the application validation block 500 can take this into account. The score of the application validation block may be based on any number of factors associated with the software component 106, such as, how many times the software component 106 is called, security requirements of the component 106, a user defined value, and/or the like.

Another embodiment is where a developer of a software component 106 stores the software component 106/component blockchain 320 in a trusted repository. The trusted repository may only allow software components 106 to be checked in based if the user (a trusted user/vendor) has been certified under a testing/validation process that confirms that the information (i.e., a progression history) in the checked in software component 106/component blockchain 320 is actually valid. This may be a third party testing facility. If a software component 106 from the trusted repository is wanted, the software component 106/component blockchain 320 can be checked out and linked to the primary blockchain 310/component blockchains 320 as described herein.

The check in process can be based on (or result in) a secure digital certificate/key from the trusted user. This can be confirmed by a consensus vote by nodes 101 in the distributed ledger 120.

Figure 7:
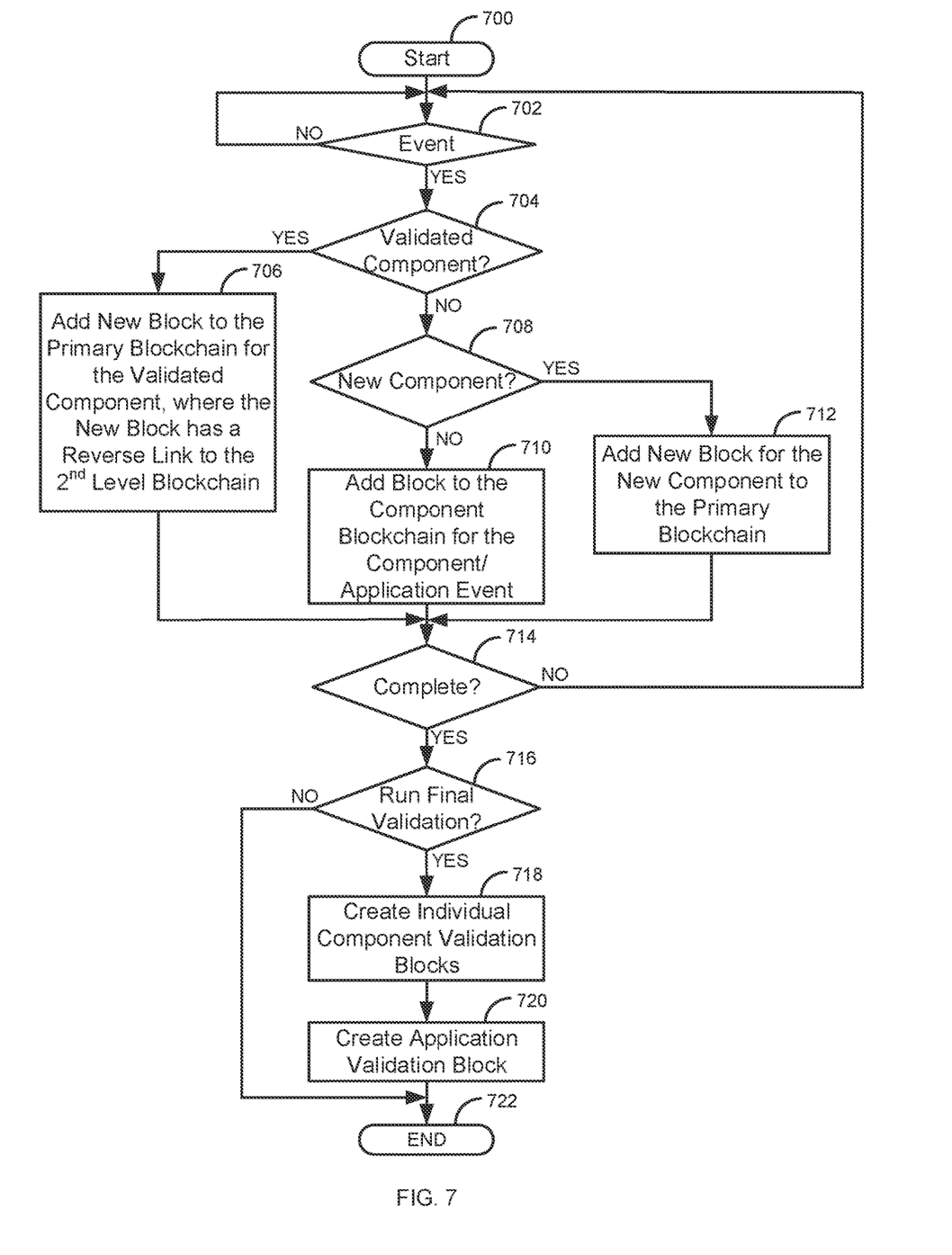
FIG. 7 is a flow diagram of a process for validating the quality/security of software components in an application.

FIG. 7 is a flow diagram of a process for validating the quality/security of software components 106 in an application 105. The process of FIG. 8 assumes that the genesis block 200 has already been created. The process starts in step 700. The process determines, in step 702, if an event associated with a software component 106/or the application 105 has been received. An event may be related to the software component 106 in various ways, such as, where the software component 106 is being tested, a security testing being run on the software component 106, an anti-virus scan of the software component 106, a compilation date/compiler version used to create the software component 106, a developer checking in an updated version of the software component 106, and/or the like.

The event may be an application level event that is associated with the application 105. For example, the event may be a sign off by a testing manager for testing of the application 105, a completion of a full testing cycle on the application 105, a compiler version used to compile the application 105, an integrated development environment used to develop the application 105, and/or the like. In this case, the event may be placed in each of the component blockchains 320 (or a subset of the component blockchains 320 if the event only applies to a subset of the component blockchains 320).

If the event is not related to the software component 106 or the application 105, the process of step 702 repeats. Otherwise, if the event is related to the software component 106 or the application 105, the process determines if the event is to add a validated component in step 704. A validated component is a software component 106 that has previously completed a certification process and has a component validation block 600. For example, the component blockchains 320A-320N in FIG. 6 are for validated software components 106. If the event is to add a validated software component 106 in step 704, the process adds, in step 706, a new block 301 to the primary blockchain 102 (assuming that the validated component is not part of another validated software component 106) for the validated software component 106. The new block 301 includes a reverse link 303 that points to the component blockchain 320. The new block 301 may also have a full (forward and/or reverse hash of the component blockchain 320. The process then goes to step 714.

If the event is not to add a validated component in step 704, the process determines, in step 708, if the event is for adding a new software component 106. If the event is to add a new software component 106 in step 708, the process adds, in step 710, a new block 301 for the software component 106 in the primary blockchain 310 (or a component blockchain 320X as shown in FIG. 6 by block 301XA). The process then goes to step 714.

If the event is not for a new component in step 708, then the event is a component or application event. The process adds a block 301 to the component blockchain 320 in step 712. If the event is an application event, the block 301 is added to the appropriate component blockchain(s) 320 based on the type of application event. The process then goes to step 714. For example, the event may be a sign-off of the software application 105, which would be an event for each software component 106.

The process determines, in step 714, if the process is complete. If the process is not complete in step 714, the process goes back to step 702. Otherwise, if the process is complete in step 714, the process determines, in step 716 if a final validation is to be run. A final validation is where the scores for the application validation block 500/component validation block(s) 600 are calculated. If the final validation run is not to be completed in step 716, the process ends in step 722.

Otherwise, if the final validation is to be run in step 716, the process creates, in step 718, the individual component validation blocks 600. The process then creates the application validation block 500 based on the scores from the individual component validation blocks 600. The process then ends in step 722.

Figure 8:
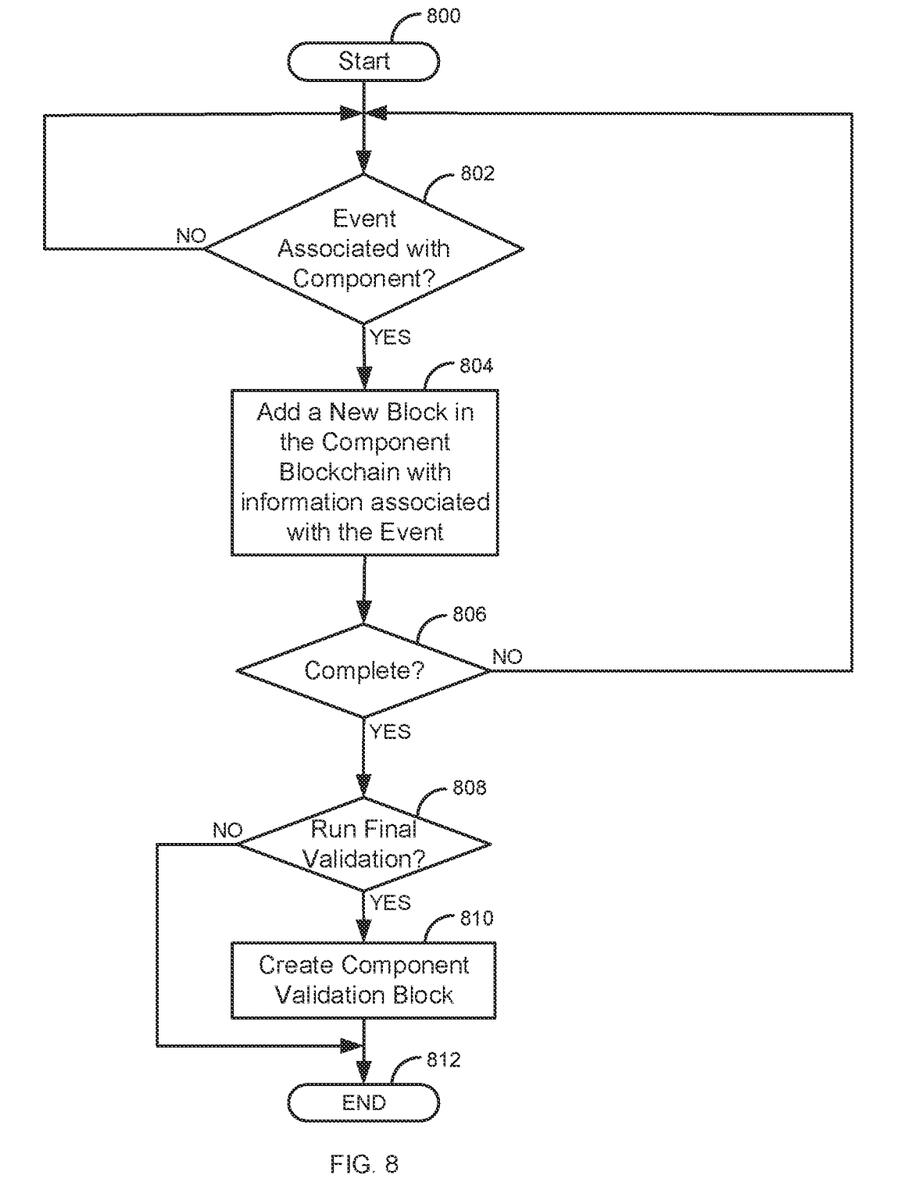
FIG. 8 is a flow diagram of a process for validation of a software component.

FIG. 8 is a flow diagram of a process for validation of a software component 106. The process starts in step 800. The process of FIG. 8 assumes that the genesis block 200 for the component is already created. The software management system 104 determines, in step 802, if an event associated with the software component 106 has been received. An event may be related to the software component 106 in various ways, such as, where the software component 106 is being tested, a security test being run on the software component 106, an anti-virus scan of the software component 106, a compilation date/compiler version used to create the software component 106, a developer checking in an updated version of the software component 106, and/or the like. If there is not an event associated with the software component 106 in step 802, the software management system 104 waits for an event associated with the software component 106 in step 802.

If there is an event associated with the software component 106 in step 802, The software management system 104, adds, in step 804, the information associated with the event to a new block 301 that is added to the component blockchain 320. The software management system 104 determines if the process is complete in step 806. If the process is not complete in step 806, the process goes back to step 802.

Otherwise, if the process is complete in step 806, the software management system 104 determines, in step 808, if a final validation is to be run. If a final validation is not to be run in step 808, the process ends in step 812. Otherwise, if the final validation is to be run in step 808, the software management system 104 creates a component validation block 600 that is added to the end of the component blockchain 320 (e.g., as described herein). The process then ends in step 812.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
   a processor; and
   a non-transitory computer readable storage medium, coupled with the processor and comprising data stored thereon that, when executed by the processor, causes the processor to:
   receive an event associated with a software component of a software application, wherein at least one block of a digital ledger is associated with the software component of the software application;
   add information describing the event associated with the software component of the software application to a new block;
   link the new block to the at least one block of the digital ledger, thereby adding the new block to the digital ledger and associating the new block with the event associated with the software component of the software application and with the software component of the software application;
   determine that a validation of the software component of the software application is to be run;
   in response to determining that the validation of the software component of the software application is to be run, create a first component validation block for the software component of the software application; and
   add the first component validation block to an end block of the digital ledger, thereby enabling validation of a supply chain of the software component of the software application, wherein reference to the first component validation block facilitates validation of the supply chain of the software component of the software application.

2. The system of claim 1, wherein the processor comprises a plurality of processors.

3. The system of claim 1, wherein the information describing the event associated with the software component of the software application comprises a version of the software component of the software application.

4. The system of claim 1, wherein the information describing the event associated with the software component of the software application comprises at least one of the following: a version of the software component of the software application, a check-in time for the software component of the software application, who checked in the software component of the software application, modifications to the software component of the software application, testing of the software component of the software application, specific tests run on the software component of the software application, when the specific tests were run on the software component of the software application, identified bugs in the software component of the software application, depth of tests of the software component of the software application, a percentage of code paths covered in the software component of the software application, customer feedback of the software component of the software application, how the identified bugs were mitigated and/or fixed in the software component of the software application, virus scans of the software component of the software application, types of security tests run on the software component of the software application, anomalies detected when testing the software component of the software application, integrated development environments used in developing the software component of the software application, compilers used in compiling the software component of the software application, virtual machines used in testing the software component of the software application, sign-offs of testing processes for the software component of the software application, a history of retesting to validate fixes for the software component of the software application, a version of the software application, and a sign-off of the software application.

5. The system of claim 1, wherein the first component validation block stores a quality and/or security score associated with the software component of the software application.

6. The system of claim 5, wherein the digital ledger further comprises a second component validation block that stores a quality and/or security score associated with the software component of the software application.

7. The system of claim 1, wherein the digital ledger comprises a blockchain.

8. The system of claim 7, wherein the blockchain is stored in a trusted repository.

9. The system of claim 1, wherein the first component validation block is generated based on the software component of the software application and based on information in another component validation block in the digital ledger.

10. The system of claim 1, wherein the first component validation block is part of a component blockchain and indicates that the software component of the software application is verified to a first level of quality and/or security, wherein the digital ledger further comprises an application validation block that indicates that the software application is verified to a second level of quality and/or security, and wherein the application validation block is based at least in part on the first component validation block.

11. A method comprising:
receiving an event associated with a software component of a software application, wherein at least one block of a digital ledger is associated with the software component of the software application;
adding information describing the event associated with the software component of the software application to a new block;
linking the new block to the at least one block of the digital ledger, thereby adding the new block to the digital ledger and associating the new block with the event associated with the software component of the software application and with the software component of the software application;
determining that a validation of the software component of the software application is to be run;
in response to determining that the validation of the software component of the software application is to be run, creating a first component validation block for the software component of the software application; and
adding the first component validation block to an end block of the digital ledger, thereby enabling validation of a supply chain of the software component of the software application, wherein reference to the first component validation block facilitates validation of the supply chain of the software component of the software application.

12. The method of claim 11, wherein the information describing the event associated with the software component of the software application comprises a version of the software component of the software application.

13. The method of claim 11, wherein the information describing the event associated with the software component of the software application comprises at least one of the following: a version of the software component of the software application, a check-in time for the software component of the software application, who checked in the software component of the software application, modifications to the software component of the software application, testing of the software component of the software application, specific tests run on the software component of the software application, when the specific tests were run on the software component of the software application, identified bugs in the software component of the software application, depth of tests of the software component of the software application, a percentage of code paths covered in the software component of the software application, customer feedback of the software component of the software application, how the identified bugs were mitigated and/or fixed in the software component of the software application, virus scans of the software component of the software application, types of security tests run on the software component of the software application, anomalies detected when testing the software component of the software application, integrated development environments used in developing the software component of the software application, compilers used in compiling the software component of the software application, virtual machines used in testing the software component of the software application, sign-offs of testing processes for the software component of the software application, a history of retesting to validate fixes for the software component of the software application, a version of the software application, and a sign-off of the software application.

14. The method of claim 11, wherein the first component validation block stores a quality and/or security score associated with the software component of the software application.

15. The method of claim 11, further comprising:
adding a second component validation block to the digital ledger that stores a quality and/or security score associated with the software application; and
linking the second component validation block with the first component validation block.

16. The method of claim 11, wherein the digital ledger comprises a blockchain stored in a trusted repository.

17. The method of claim 11, wherein the first component validation block is part of a component blockchain and indicates that the software component of the software application is verified to a first level of quality and/or security, wherein the digital ledger further comprises an application validation block that indicates that the software application is verified to a second level of quality and/or security, and wherein the application validation block is based at least in part on the first component validation block.

18. A non-transitory computer readable storage medium having stored thereon instructions that cause a processor to execute a method, the method comprising:

receiving an event associated with a software component of a software application, wherein at least one block of a digital ledger is associated with the software component of the software application;

adding information describing the event associated with the software component of the software application to a new block;

linking the new block to the at least one block of the digital ledger, thereby adding the new block to the digital ledger and associating the new block with the event associated with the software component of the software application and with the software component of the software application;

determining that a validation of the software component of the software application is to be run;

in response to determining that the validation of the software component of the software application is to be run, creating a first component validation block for the software component of the software application; and adding the first component validation block to an end block of the digital ledger, thereby enabling validation of a supply chain of the software component of the software application, wherein reference to the first component validation block facilitates validation of the supply chain of the software component of the software application.

19. The non-transitory computer readable storage medium of claim 18, wherein the information describing the event associated with the software component of the software application comprises at least one of the following: a version of the software component of the software application, a check-in time for the software component of the software application, who checked in the software component of the software application, modifications to the software component of the software application, testing of the software component of the software application, specific tests run on the software component of the software application, when the specific tests were run on the software component of the software application, identified bugs in the software component of the software application, depth of tests of the software component of the software application, a percentage of code paths covered in the software component of the software application, customer feedback of the software component of the software application, how the identified bugs were mitigated and/or fixed in the software component of the software application, virus scans of the software component of the software application, types of security tests run on the software component of the software application, anomalies detected when testing the software component of the software application, integrated development environments used in developing the software component of the software application, compilers used in compiling the software component of the software application, virtual machines used in testing the software component of the software application, sign-offs of testing processes for the software component of the software application, a history of retesting to validate fixes for the software component of the software application, a version of the software application, and a sign-off of the software application.

20. The non-transitory computer readable storage medium of claim 18, wherein the first component validation block is part of a component blockchain and indicates that the software component of the software application is verified to a first level of quality and/or security, wherein the digital ledger further comprises an application validation block that indicates that the software application is verified to a second level of quality and/or security, and wherein the application validation block is based at least in part on the first component validation block.

* * * * *